US012618194B2

(12) United States Patent
Hossain et al.

(10) Patent No.: US 12,618,194 B2
(45) Date of Patent: May 5, 2026

(54) METHOD OF PRODUCING AN OBJECT HAVING A FLUORINATED POLYMER COATING

(71) Applicant: Sefar AG, Heiden (CH)

(72) Inventors: Mohammad Mokbul Hossain, Heiden (CH); Christoph Ellenberger, Kriessern (CH); Karim Chakhari, St. Gallen (CH)

(73) Assignee: Sefar AG, Heiden (CH)

( * ) Notice: Subject to any disclaimer, the term of this patent is extended or adjusted under 35 U.S.C. 154(b) by 0 days.

(21) Appl. No.: 18/383,663

(22) Filed: Oct. 25, 2023

(65) Prior Publication Data

US 2024/0175200 A1 May 30, 2024

(30) Foreign Application Priority Data

Nov. 29, 2022 (EP) ..................................... 22210166

(51) Int. Cl.
| | |
|---|---|
| *D06M 15/256* | (2006.01) |
| *C09D 5/16* | (2006.01) |
| *C09D 127/12* | (2006.01) |
| *D06M 10/02* | (2006.01) |
| *D06M 10/10* | (2006.01) |
| *D06M 101/32* | (2006.01) |

(52) U.S. Cl.
CPC ......... *D06M 15/256* (2013.01); *C09D 5/1656* (2013.01); *C09D 127/12* (2013.01); *D06M 10/025* (2013.01); *D06M 10/10* (2013.01); *D06M 2101/32* (2013.01)

(58) Field of Classification Search
CPC ............................ D06M 15/256; C09D 5/1656
See application file for complete search history.

(56) References Cited

U.S. PATENT DOCUMENTS

| | | | |
|---|---|---|---|
| 2007/0093076 A1 | 4/2007 | Mikhael et al. | |
| 2021/0214887 A1* | 7/2021 | Hussey ................. | D06M 14/26 |

FOREIGN PATENT DOCUMENTS

| | | | | |
|---|---|---|---|---|
| JP | S61211833 A | 9/1986 | | |
| JP | H01207475 A | 8/1989 | | |
| JP | H0314677 A | 1/1991 | | |
| JP | H08502560 A | 3/1996 | | |
| KR | 930005922 B1 * | 6/1993 | ........... | D06M 14/26 |
| WO | 2006131081 A1 | 12/2006 | | |
| WO | 2008106903 A2 | 9/2008 | | |

OTHER PUBLICATIONS

European Search Report for corresponding European Patent Application No. EP 22210166.9, 12 pages.
Japanese Office Action for corresponding Japanese Patent Application No. 2023-192207 mailed on Apr. 30, 2025, 19 pages.
Korean ffice Action for corresponding Korean Patent Application No. 2023-0166296 mailed on Sep. 3, 2025, 20 pages.

* cited by examiner

*Primary Examiner* — Tabatha L Penny
(74) *Attorney, Agent, or Firm* — Harness, Dickey & Pierce, P.L.C.

(57) ABSTRACT

The invention relates to a method of producing an object having a fluorinated polymer coating free of per- and polyfluorinated acids and salts thereof, wherein the method comprises a step DF of depositing a fluorinated polymer coating on the object by means of plasma polymerization of a fluorinated precursor monomer and a step IG of exposing the object to an inhibiting gas which inhibits the formation of per- and polyfluorinated acids and salts thereof in or on the deposited fluorinated coating. Thereby step IG is carried out after step DF, and from the start of step DF until the end of step IG the object is treated in a substantially oxygen free atmosphere.

20 Claims, 3 Drawing Sheets

METHOD OF PRODUCING AN OBJECT HAVING A FLUORINATED POLYMER COATING

CROSS-REFERENCE TO RELATED APPLICATIONS

Figure 1:
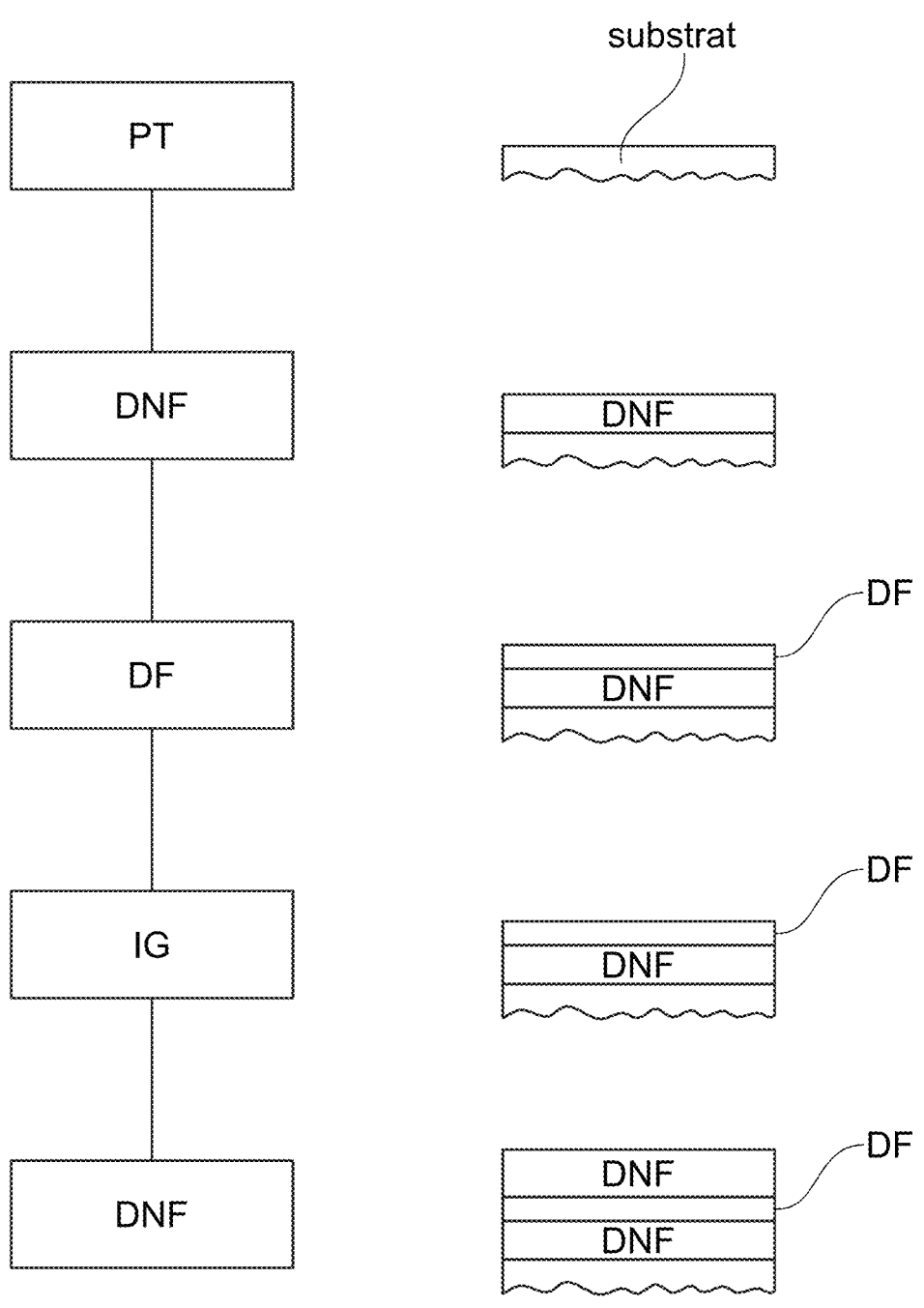

This application claims the benefit of European Patent No. EP 22 210 166.9, filed Nov. 29, 2022. The disclosure of the above application is incorporated herein by reference.

The invention relates to a method of producing an object having a fluorinated polymer coating free of per- and polyfluorinated acids and salts thereof.

Further the invention also relates to an object comprising a fluorinated polymer coating free of per- and polyfluorinated acids and salts thereof.

BACKGROUND

Anthropogenic organic compounds like per- and polyfluorinated alkyl substances are among substances of very high concern (SVHCs) and represent a large family which have been used in a variety of industries. The literature has reported the use of these compounds as processing additives and as surfactants since 1940s. These compounds, which have special properties including fire resistance and oil, stain, grease, and water repellency, have been used commonly in the production of non-stick cookware, specialized garments and textiles, stain repellents, metal plating, and fire-fighting foams. They are classified in two groups of PFAS; perfluoroalkyl sulfonic acids (PFSA) and perfluorocarboxylic acids (PFCA). These synthetic substances that do not occur naturally in the environment and PFAS including its related salts has been already detected in different types of aqueous environments with different concentration. This is not surprising at all since certain PFAS are persistent and bioaccumulate. C8 based PFAS have already been listed as regulatory substances in the EU, and perfluorooctanesulfonic acid (PFOS) has been classified as persistent organic pollutants (POPs) in 2009. Also, regulation to avoid and to ban per- and polyfluorinated acids and salts thereof exist or are in preparation.

Plasma polymerization or plasma deposition processes have been a vibrant area of research as it provides a versatile route to design materials with tunable functionalities. Due to its exclusive properties of plasma polymer smart coatings like tunable wettability, self-cleaning and antireflective make them prominent in diverse applications such as biomaterials, drug delivery, adhesion, protective coatings, microelectronic devices, oil-water separation and thin film technology. Moreover, using classical wet chemical polymerization may lead to adverse effects on polymer coatings, such as non-uniform coatings, the impurities by the solvent produces defective coatings due to the presence of solvent. To avoid such issues plasma enhanced chemical vapor deposition (PECVD) is the suitable polymerization method that utilizes precursors in either liquid or gas form for rapid, pinhole free, cross-linked and dry deposition of the polymer.

It is known that plasma treatment improves the crosslinking degree in polymer when compared to classical polymerization. Such a quite controlled polymerization process occurs with the assistance of plasma energy during plasma polymerization and this plasma energy is used to activate electrons, ions and radicals. Explaining more the plasma polymerization process; monomer precursors which are in vapor form are pumped to the vacuumed plasma reactor. The energy input generates then excited electrons during glow discharge and lead to break molecules into free electrons, ions, radicals and excited molecules. In a later stage these free radicals and excited molecules recombine, condense and polymerize on the substrate, and the ions and electrons crosslink or form chemical bonds with the already deposited polymer, so the properties of plasma polymers are not only determined by precursors but also by the deposition parameters. Films polymerized from perfluorinated precursors and deposited by glow discharge (plasma deposition) are taking increasingly a wide interest. In fact the deposition method is very unique and presents many advantages such as solvent free, room temperature process, controlled thickness of deposited film including surface texture and surface chemistry design through monomer selection and plasma reactor condition.

However, it has been found that objects, like fabrics, that were treated by a plasma deposition processes using fluorinated precursors also may comprise a reasonable amount of per- and polyfluorinated acids and salts thereof.

SUMMARY

It is therefore the object of the invention to provide a method of producing an object having a fluorinated polymer coating deposited by a plasma deposition process, which is free of per- and polyfluorinated acids and salts thereof as well as to provide an object comprising a fluorinated polymer coating which is free of per- and polyfluorinated acids and salts thereof.

According to the invention this object is achieved on the one hand by a method having the features of claim 1 and by an object, like a fabric, having the features of claim 15.

Preferred embodiments of the invention are stated in the respective dependent claims.

According to the inventive method in a step DF of a fluorinated polymer coating is deposited on the object by means of plasma polymerization of a fluorinated precursor monomer. Further in a step IG the object is exposed to an inhibiting gas which inhibits the formation of per- and polyfluorinated acids and salts thereof in or on the deposited fluorinated coating and step IG is carried out after step DF. Additionally, from the start of step DF until the end of step IG the object is treated in a substantially oxygen free atmosphere.

A basic idea of the invention results in the fact that it was discovered that during plasma deposition process to produce a fluorinated polymer coating, free radicals and further active components, which are generated during plasma polymerization are the major initiators to form per- and polyfluorinated acids and salts thereof if they get into contact with oxygen during fluorinated polymerization and/or after the fluorinated coating.

The fundamental principles for this formation are expected to be the following. The radicals predominantly take part in the deposition process (radical-dominated plasma) as compared to other plasma species such as neutral gas particles, excited states, ions, electrons, and UV. These radicals can further react with the monomer molecules, or they can recombine each other and form coating. Still there is a relevant number of reactive intermediates such as excited states, free radicals etc. remained at the growing film which might react with oxygen when the object is exposed to for example atmosphere. As a consequence, per- and polyfluorinated acids and their salts can be formed in coating.

However, according to the invention, it was discovered that if the object which was treated in the step DF for a plasma deposition of fluorinated polymer coating, after this plasma process is treated with an inhibiting gas, the formation of the undesirable per- and polyfluorinated acids and their salts can be reduced and ideally prevented. In this connection, it may be essential, that in the time between the beginning of the DF step until the IG step is finished, the object is treated in a substantially oxygen-free atmosphere, so that none of the undesired components can develop.

The functional processes to eliminate the formation of the pre- and polyfluorinated acids and their salts is based on the following:

Firstly, the polymerization of fluorinated monomer is to be done oxygen free atmosphere, preferably in a vacuum. Addition of oxygenated species or gases directly react with fluorinated components during plasma polymerization and forms per- and polyfluorinated acids and salts. In this connection and as used explaining the inventions, the term substantially oxygen-free atmosphere according can be understood, that no external oxygen is available like the oxygen in the normal air. This does not relate to small amounts of oxygen which may be in a processing chamber, which can be evacuated, due to the outgassing of oxygen out of the material of object itself.

Secondly, the elimination of per- and polyfluorinated compounds also strongly depends on inhibiting step which is performed directly after the deposition of fluorinated coating. A post-treatment during inhibition step using hydrogen, nitrogen, hydrocarbon and or mixture thereof can deactivate with the remaining reactive intermediates formed in the deposited coating as described above and thus, a chemically inactive coating via propagation, saturation etc. can be produced.

Preferably in step IG while exposing the object to an inhibiting gas no plasma, a plasma with a plasma power less than half of the plasma power of step DF, or a plasma with a maximum plasma power equal to the plasma power of step DF is present. As previously explained, the free radicals and other active components leading to the formation of per- and polyfluorinated acids and their salts are at least partly created due to the energy provided by the plasma during the previous plasma deposition in step DF. To further avoid their creation, it is advantageous to use the less possible plasma power during the IG step.

In an embodiment a further step DNF of depositing a non-fluorinated polymer coating on the object by means of plasma polymerization of a non-fluorinated precursor monomer is carried out, wherein step DNF is carried out before and/or after step DF.

Traditionally, in a step DF of depositing a fluorinated polymer coating long molecular chain e.g., C8 fluorocarbon (FC) compounds were used for coating to protect objects not only from warfare agents, but also from everyday substances such as water, oils, fuel, lubricants, cleaning solvents, and other contaminants. However, due to their potential high toxicity, legislation has been put in place to restrict or ban their usage throughout the world. Alternative coatings have been developed and brought into market. In particular, short chain C6 fluorochemical coatings have come close in performance to traditional C8 based FC coatings without the high environmental risk.

The use of C6 FC based still has resulted in global environmental contamination because it contains traces of perfluorooctanoic acid (PFOA) and its salts and concern has been raised because of the persistence and potential for bioaccumulation of these substances. Moreover, the REACH regulation (EU/784/2020) which is effective from 3 Dec. 2020 allows to keep the PFOA threshold value under 25 ppb (parts per billion). Therefore, a general trend is to avoid these chemistries for health reasons.

The straightforward step to replace the later by ultrashort chain C3 to C1 fluorocarbon (FC) like per- and polyfluoroalkyl substances (PFAS) seems on the first sight a promising solution. However, even though these compounds in principle provide hydrophobic and oleophobic characteristics, it was realized that when using plasma nanocoating to deposit them on objects as fabrics problems arise. During the process of plasma polymer coating the thickness of a PFAS based C3 to C1 fluorocarbon (FC) layer is very thin compared to the previous C6 to C8 based fluorocarbon (FC) layer. Hence the layer especially provided especially on a fabric, e.g., a woven fabric, only provides an insufficient layer and therefore improvable hydrophobic characteristics. Surprisingly it was realised that even the thinner layer provides good oleophobic characteristics.

Hexamethyldisiloxane (HMDSO) as a non-fluorinated polymer coating is one choice of industries as alternative to C6 FC because it is a non-toxic material, and no harmful materials are produced during processing. It is widely used as precursor monomer for plasma processes due to its suitable vapor pressure. Carbon-rich, plasma polymerized HMDSO (pp-HMDSO) from pure HMDSO, shows promising mechanical properties such as low internal stress, good adhesion and excellent hydrophobic barrier performance. Although the water resistance provided by pp-HMDSO coating is promising, but it does not pose any oleophobic properties.

Therefore, according to this embodiment, it is proposed to use a combination of a non-fluorinated polymer coating in a step DNF and the classic fluorinated polymer coating in a step DF using C6, preferably C3 to C1 fluorocarbons. Thereby, the sequence of the two steps can be arbitrary, however, it is preferred that the DNF step is carried out before the DF step.

Preferable the plasma deposition processes for depositing the fluorinated polymer coating in step DF and/or plasma deposition processes for depositing the non-fluorinated polymer coating in step DNF are low-pressure plasma processes and/or atmospheric plasma processes under protective atmosphere.

Low-pressure plasma coating technology is also known as plasma enhanced chemical vapour deposition (PECVD) method. It is used a cold plasma. Hence the technology is suitable for temperature sensitive polymeric materials such as monofilament mesh, composite membranes. Using PECVD highly cross-linked polymer network having functional groups incorporated into the network can be deposited, thus a high long-term stability of the modified surface can be obtained. The fluorinated coating doesn't degrade to PFAS.

Preferably the inhibiting gas in step IG is hydrogen, nitrogen, hydrocarbon, a mixture there-of and/or a gaseous mixture containing any of the before mentioned gases. It has been discovered that these gases or mixtures thereof are surprisingly efficient in inhibiting the free radicals and the further active components leading to the formation of per- and polyfluorinated acids and salts thereof.

The inhibiting step has been shown to play an important role to eliminate per- and polyfluorinated acids and their salts. The inhibition process can be performed on fluorinated coating using hydrogen, nitrogen and hydrocarbon gases in a vacuum chamber directly after fluorinating deposition process, without bringing the object into the atmosphere. Free radicals, oxygenated species, charged particles etc. are formed at the surface during plasma polymerization of a fluorinated precursor. The inhibition step neutralizes those reactive components and thus, per- and polyfluorinated compounds are effectively removed, when coated object is exposed to an inhibiting gas. This is underlined by the numbers shown in table 1 as it is shown that the inhibiting step drastically reduce the amount of per- and polyfluoralkyl derivatives.

TABLE 1

Per- and polyfluoralkyl derivatives in ppb
in a fabric with and without the IG step

| | Measured amount in ppb | |
| Tested per- and polyfluorinated acids and salts according to Standard 100 by OEKO-TEX | C3-based fluorinated coating without IG step | C3-based fluorinated coating after IG step |
|---|---|---|
| PFOA | 31 | <10 |
| PFHpA | 42 | <10 |
| PFNA | 24 | <10 |
| PFDA | 14 | <10 |
| PFUdA | <10 | <10 |
| PFDoA | <10 | <10 |
| PFTrDA | <10 | <10 |
| PFTeDA | <10 | <10 |
| PFBA | 110 | <10 |
| PFPeA | 63 | <10 |
| PFHxA | 61 | <10 |
| PF-3,7-DMOA | <10 | <10 |
| PFBS | <10 | <10 |
| PFHxS | <10 | <10 |
| PFHpS | <10 | <10 |
| PFDS | <10 | <10 |
| 7HPFHpA | <10 | <10 |
| 4HPFUnA | <10 | <10 |
| 1H, 1H, 2H, 2H-PFOS | <10 | <10 |
| PFOS, PFOSA, PFOSF, N—Me-FOSA, N—Et-FOSA, NMe-FOSE, N—Et-FOSE; Sum | <1* | <1* |
| HFPO-DA | <10 | <10 |
| 8:2 FTS | <10 | <10 |
| PFOA related substances (sum) | <1000 | <1000 |
| 4:2 FTOH | <100 | <100 |
| 6:2 FTOH | <100 | <100 |
| 8:2 FTOH | <100 | <100 |
| 10:2 FTOH | <100 | <100 |
| 6:2 FTA | <100 | <100 |
| 8:2 FTA | <100 | <100 |
| 10:2 FTA | <100 | <100 |

*The unit is in $\mu g/m^2$

Varying deposition conditions can be used in order to reduce concentration of per- and polyfluorinated substances. Depending on the process parameters, especially plasma power, PFC compounds varied. Higher energy input yields higher plasma dissociation/fragmentation and contributes to a higher generation of PFC compounds in the growing films due to the more energetic ion bombardment. On the other hand, it is challenging to obtain a good oil repellency with very low energy input. According to invention, it was found that a plasma power during step DF and/or step DNF is lower than 1 W/cm² of electrode surface, preferably lower than 500 mW/cm² of electrode surface or more preferably lower than 200 mW/cm² of electrode surface is necessary to obtain suitable coating characteristics without having PFC compounds.

TABLE 2

The effect of plasma power on reduction
of per- and polyfluorinated compounds

| | Measured amount in ppb | |
| Tested per- and polyfluorinated acids and salts according Standard 100 by OEKO-TEX | C3-based fluorinated coating with IG step with plasma power 36.7 mW/cm² | C3-based fluorinated coating with IG step with plasma power 18.4 mW/cm² |
|---|---|---|
| PFOA | <10 | <10 |
| PFHpA | 15 | <10 |
| PFNA | 12 | 11 |
| PFDA | <10 | 11 |
| PFUdA | <10 | <10 |
| PFDoA | <10 | <10 |
| PFTrDA | <10 | <10 |
| PFTeDA | <10 | <10 |
| PFBA | 48 | 15 |
| PFPeA | 27 | <10 |
| PFHxA | 19 | <10 |
| PF-3,7-DMOA | <10 | <10 |
| PFBS | <10 | <10 |
| PFHxS | <10 | <10 |
| PFHpS | <10 | <10 |
| PFDS | <10 | <10 |
| 7HPFHpA | <10 | <10 |
| 4HPFUnA | <10 | <10 |
| 1H, 1H, 2H, 2H-PFOS | <10 | <10 |
| PFOS, PFOSA, PFOSF, N—Me-FOSA, N—Et-FOSA, NMe-FOSE, N—Et-FOSE; Sum | <1* | <1* |
| HFPO-DA | <10 | <10 |
| 8:2 FTS | <10 | <10 |
| PFOA related substances (sum) | <1000 | <1000 |
| 4:2 FTOH | <100 | <100 |
| 6:2 FTOH | <100 | <100 |
| 8:2 FTOH | <100 | <100 |
| 10:2 FTOH | <100 | <100 |
| 6:2 FTA | <100 | <100 |
| 8:2 FTA | <100 | <100 |
| 10:2 FTA | <100 | <100 |

*The unit is in $\mu g/m^2$

The fluorinated plasma coating in step DF can be performed using perfluorocarbon or perfluorinated hydrocarbon and/or the non-fluorinated plasma coating in step DNF can be performed using organosilane, siloxane and/or hydrocarbon precursors.

In on embodiment the method can comprise the additional step PT of a pre-treatment of the object by means of an atmospheric or low-pressure plasma using an inert gas and/or a reactive gas, wherein step PT is carried out before step DNF and/or DF, preferably as first step. The PT step can be carried out to clean the surface of the object to be treated, so that the deposition of the films can be achieved in a more efficient way. In this connection, the PT step can preferably be carried out as the first step before the DNF step and the DF step. However, based on the exact object to be treated, it can also be beneficial to carry out the PT step every time before a DNF step and/or a DF step.

It is sufficient to carry out the step IG only once after all other steps have been carried out, especially if between the different steps no oxygen is present. However, it is beneficial of the IG step is carried out every time, especially directly, after step DF, PT and/or step DNF is carried out to inactivate reactive plasma-based substances, particles or components formed on the coated object surface during previous plasma depositions of steps DF, PT and/or DNF. In this way, the inhibiting of undesired substances is improved. Also, the free radicals and other active substances of a previous coating step will not be coating in a following coating step but will be inhibited in between.

Depending on the used material to be deposited in step DF a fluorinated polymer coating which is deposited on the object may have a thickness from 5 nm to 300 nm and/or in step DNF the non-fluorinated polymer coating which is deposited on the object may have a thickness from 30 nm to 700 nm. In general, the deposition in steps DF and DNF should lead to improved surface properties of the object. In detail, it is aimed to provide the object with a hydro- and/or oleophobic coating or surface properties. Thus, the non-fluorinated polymer coating does not provide such good properties as the fluorinated polymer coating and therefore, it is beneficial, that the coating thickness of the non-fluorinated polymer coating is thicker than that of the fluorinated polymer coating.

In principle, there is no upper or lower limit for the plasma power during the deposition steps DF and/or DNF. However, it is preferred that the plasma power during step DF and/or step DNF is lower than 1 $W/cm^2$ of electrode surface, preferably lower than 500 $mW/cm^2$ of electrode surface or more preferably lower than 200 $mW/cm^2$ of electrode surface. This seems to be a good compromise between sufficient deposition of polymers, which is improved by higher energies, and the creation of the undesired components leading to of per- and polyfluorinated acids and salts thereof.

Preferably the object comprises polymeric materials of woven mesh, woven fabrics, knitted fabrics, nonwoven, nonwoven meltblown, nonwoven spunbond fabric, membranes, composite membranes and combination of thereof. If a woven material is used, especially monofilament yarn is preferred.

In detail the object can be made of and/or comprise one or more of the following materials or combinations thereof: polyvinyliden chloride (PVDC), polyvinylidene fluoride (PVDF), polyhexamethylen adipamide (PA6.6), polydodecanamide (PA12), polypropylene (PP), polycaproamide (PA6), polyethylene terephthalate (PET), ethylene monochlor trifluor ethylene (E-CTFE), ethylene tetrafluor ethylene (ETFE), polyethylene (PE), polyoxymethylen (POM), polycaprolactone (PCL), polysulfone (PS), polyvinylidene fluoride (PVDF), chitosan (CH), polyvinylbutyral (PVB), 1-dodecyltrimethylammonium bromide (DTAB), chlorhexidine (CHX), benzyltrimethylammonium bromide (BTAB), polyacrylate, polyethylene (PE), high density PE, fluorized ethylenepropylene (FEP), bi-component (PA6/PA12), polybutylene terephthalat (PBT), polyetheretherketone (PEEK), perfluoralkoxy (PFA), polyacrylonitrile (acrylic fibers) (PAN), bi-component, PET flame retardant (PET/PBT), polyundecanamide (PA 11), polytetrafluorethylene (PTFE), polyphenylensulfide (PPS), polyhexamethylen sebacinamid (PA6.10), aramide (AR), polyethylene naphtalate (PEN), polyamide carbonfiber (PA/CF), polyester carbonfiber (PET/CF), polyester staple fiber/metalfiber (PET/MT), carbon fiber (CF), copper (CU), polyimide (P84), copper/silver (CU/AG), polycarbonat (PC), aliphatic polyamide, aromatic polyamide, polyurethane (PU), polyvinyl alcohol (PVA), polylactide (PLA), polybenzimidazole (PBI), polyethylenoxide (PEO), poly(butylene terephthalate), polyvinylchloride (PVC), cellulose, cellulose acetate (CA), polypropylene (PP), PVA/silica, $PAN/TiO_2$, PETFE polyetherimide (PEI), polyaniline, poly(ethylene naphthalate), styrenebutadiene rubber, polystyrene, poly(vinyl butylene), polymethylmethacrylate (PMMA).

One may understand that any object being formed in any fabrication process, cannot be 100% free of certain substances. Therefore, according to the invention, the fluorinated coating should be understood as free from per- and polyfluorinated acids and salts thereof according to Standard 100 by OEKO-TEX and/or DIN CEN/TS 15968:2010.

In principle, the previously explained steps PT, DNF, DF and IG can be carried out in any arbitrary sequence as well as it is possible to carry out several steps more than once. In one preferred embodiment, the steps are carried out in the following order: step PT, step DNF, step DF, step IG and, optionally, step DNF again. It has been recognized that treating an object to be provided with an oleo- and hydrophobic coating by the steps in the previously defined sequence, leads to an extraordinary result.

Based on the inventive method, it is possible to produce an object comprising a fluorinated polymer coating free of per- and polyfluorinated acids and salts thereof formed thereon. This object can for example be used as protective vent in mobile devices, as filters for many applications: acoustic vents, ventilation filters, fuel filtration, water separation, clothing, packaging, building and electronic seals/circuit boards, shoes, wound dressings or facial masks. The invention is further directed to electronic or electrical appliances such as mobile phones, portable media players, high fidelity equipment, tablets, laptops, portable devices of any kind and televisions. The object according to the invention can be used for diverse venting applications in healthcare such as infusion/transfusion/blood filters, matrasses, pillows, duvets, beddings, ventilation filter for (electric) equipment (in and/or out), (surgical) masks, (surgical) coats, intravenous inline filter sets, pressure filtration equipment, in particular in medical devices, room ventilation and venting barrier media for industrial applications.

DRAWINGS

Figure 2:
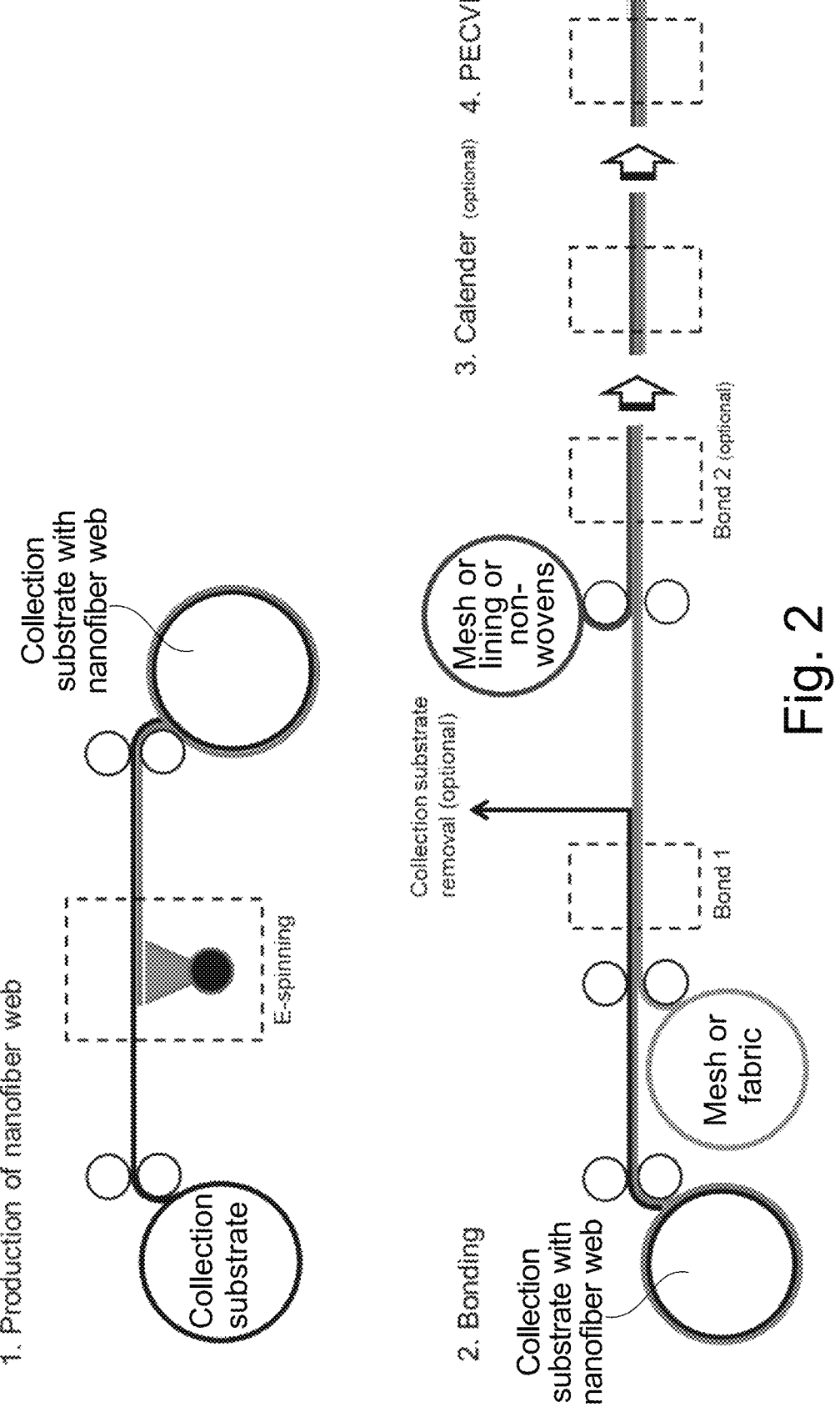
Figure 3:
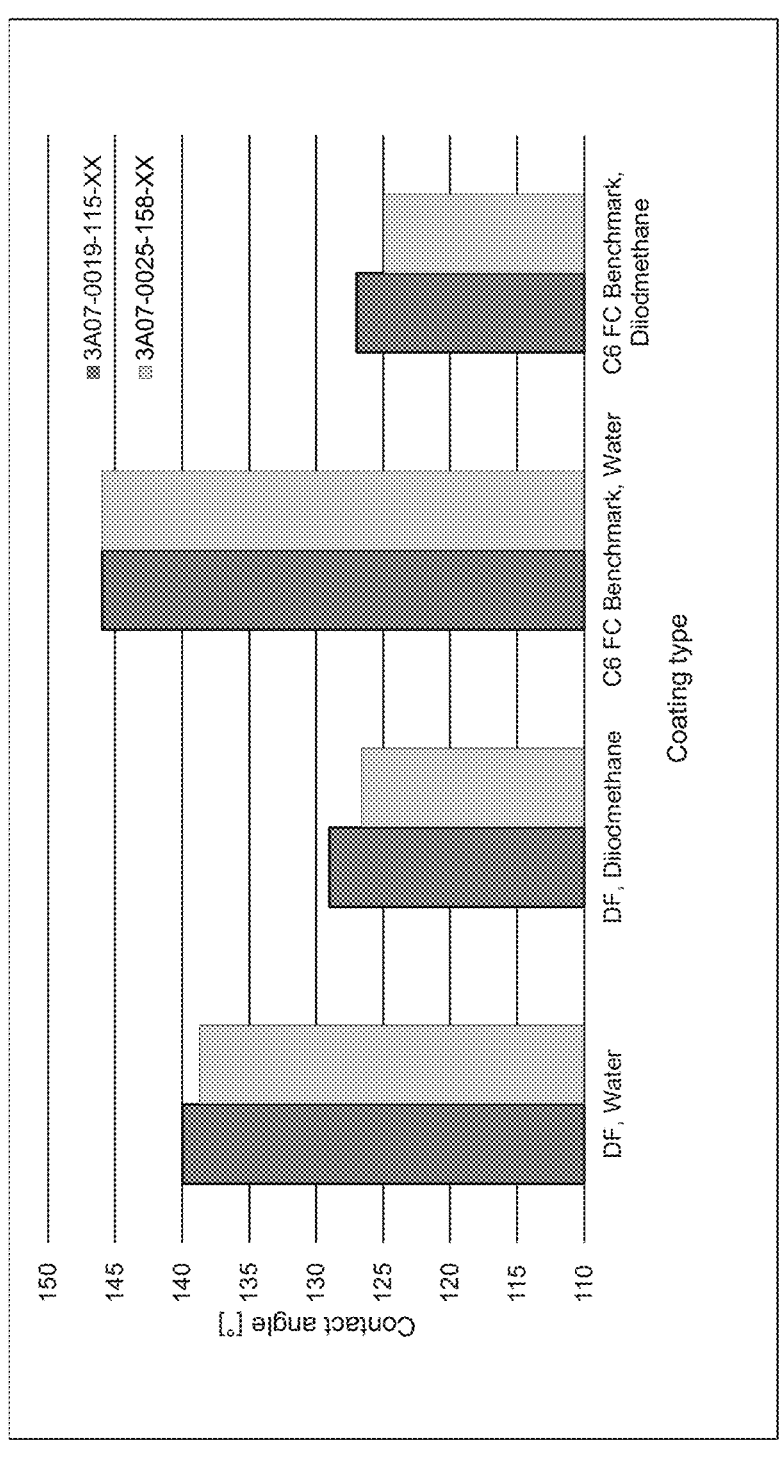

In the following the invention is described further by way of a preferred exemplary embodiment illustrated schematically in the accompanying drawings, wherein show:

FIG. 1 a combination of a schematic flow chart of the inventive method including an illustration of the different deposited films on an object;

FIG. 2 a schematic drawing of a method to produce a polymeric composite fabric; and FIG. 3 a diagram showing a comparison of contact angles on DF/DNF-coated and C6-coated articles.

DETAILED DESCRIPTION

On the left side of FIG. 1 a schematic flow diagram is shown, comprising several steps according to the invention. The right side of FIG. 1 illustrates the deposited layers on an object.

According to this embodiment, first a step PT is carried out. In this step, a plasma pre-treatment of the surfaces of an object, which should be a substrate to deposit the different following layers on, is carried out. The plasma treatment is preferably performed in a closed chamber with a low-pressure atmosphere. The aim of the treatment is to clean the surface of the substrate or object, so to better deposit the following polymers. Due to the plasma treatment, depending on the used power, it is also possible to roughen the surface of the substrate, so that the following layers can adhere better. Sometime this roughening is seen as creating micro grooves into the material of the substrate.

Following the PT step, a DNF step is carried out to deposit a non-fluorinated polymer coating on the object. Preferably, the object to be coated is kept in the chamber with the low pressure or with the vacuum during the entire treatment process.

The non-fluorinated polymer coating can be based on organosilanes (trimethyl silane etc.), siloxans (hexamethyl-disiloxane, tetramethylsilane etc.), hydrocarbon (methane, ethane, acetylene etc.) and a mixture of thereof.

As can be seen on the right side, after the cleaning of step PT, a first deposition layer DNF is applied onto the substrate.

Following the DNF step, a step DF is executed wherein a fluorinated polymer coating is deposited onto the previous DNF layer. Due to the combination of these two layers, shown on the right side only in a very simplified manner, it can be ensured that the whole surface of the substrate is coated. Normally the deposition of the layers may not be this constant.

The fluorinated polymer coating of the DF step can be based on ultrashort-chain perfluorocarbons (hexafluoropro-pene, octafluoropropene, trifluoropropene, pentafluoropro-pene etc.), fluorsurfactants, acrylic monomer with C1/C2/C3 carbonfluorid based, fluorinated acrylates (perfluorodimeth-ylcyclohexane).

Following the DF step, a step IG is executed, wherein the previously double coated substrate and therefore also the two coatings are exposed to an inhibiting gas. The aim of this exposure is to inhibit the formation of per- and polyfluo-rinated acids and their salts, should the coated object be brought into contact with oxygen.

The post-treatment during inhibition step using i.e., hydrogen, nitrogen, hydrocarbon and or mixture thereof can deactivate with the remaining reactive intermediates formed in the deposited coating as described above and thus, a chemically inactive coating via propagation, saturation etc. can be produced.

According to the invention it may be essential that, until the step IG is carried out, the treated and coated object is handled in an essentially oxygen-free atmosphere. Accord-ing to the invention, this can be understood in a way that all the treatment and the deposition is done in a chamber which has a vacuum atmosphere, a low-pressure atmosphere or an atmosphere without external oxygen as is present in air. If in the chamber a vacuum is present, outgassing of water vapour comprising oxygenated substances out of the substrate may occur, hence it is hard to achieve a 100% oxygen-free atmosphere. However, these small amounts of oxygenated substances do not have any negative effect to inhibit the formation of per- and polyfluorinated acids and salts thereof.

After the step IG is executed, in principle the coated object can be used or delivered to further processing.

However, in this embodiment, to further improve the characteristics of the object, an additional DNF step is foreseen to provide a further coating. In this connection, it can be underlined that due to the use of non-fluorinated polymers during this step, the creation of critical radicals and active substances which may lead to pre- and polyfluo-rinated acids and salts thereof in combination with oxygen, does not occur, so that this step can also be carried out under atmospheric pressure including oxygen.

As can be seen on the right side in a simplified manner, the object to be coated in this way is provided with a fluorinated polymer coating which is sandwiched by two non-fluorinated polymer coatings.

Generally, the object to be coated can be of any kind. Preferably, the inventive method is used to coat composite membranes made of one or more carrying layers and a one or more membrane layers. For this a further example is explained in the following figures.

The scheme of FIG. 2 shows an example for a manufac-turing process for a polymeric fabric like a composite comprising a carrier layer. A collection substrate (top pic-ture) is provided on which an electrospinning membrane is formed (first production step). The electrospinning mem-brane is formed according to generally known concepts and further described in the following.

In a second step the formed membrane is transferred and bonded (Bond 1) onto a carrier layer and the original collection substrate on which the electrospinning membrane has been formed can be optionally removed (collection substrate removal). According to the above provided to diagram the carrier layer can be a mesh or fabric.

Optionally their second bonding (Bond 2) can take place after introduction of the second outer layer followed by an optional calendering process. Thus, the membrane can be optionally arranged between two equal or different layers forming a sandwich structure. The second outer layer can be provided for example as a mesh, lining or nonwoven mate-rial. Finally, the inventive plasma coating is applied to at least one carrier layer and the membrane.

A first layer providing hydrophobic characteristics only and a following layer providing hydrophobic and oleophobic characteristics may be deposited. The first layer may be a pp-HMDSO, a fluorine doped HMDSO, a DLC or a fluorine doped DLC layer. The further, outer layer may be a layer based on PFAS comprising only one, two or three C-atoms and/or based on PFPE.

Electrospinning

The processes for making the nanofiber web are illus-trated in WO 2006/131081, WO 2008/106903.

Briefly, in the electrospinning process a high voltage is used to create an electrically charged jet of polymer solution or melt out of the pipette. Before reaching the collecting screen, the solution jet evaporates or solidifies and is col-lected as an interconnected web of small fibers. One elec-trode is placed into the spinning solution/melt and the other attached to the collector. In most cases the collector is simply grounded. The electric field is subjected to the end of the capillary tube that contains the solution fluid held by its surface tension. This induces a charge on the surface of the liquid. Mutual charge repulsion and the contraction of the surface charges to the counter electrode cause a force directly opposite to the surface tension. As the intensity of the electric field is increased, the hemispherical surface of the fluid at the tip of the capillary tube elongates to form a conical shape known as the Taylor cone. Further increasing the electric field, a critical value is attained with which the repulsive electrostatic force overcomes the surface tension and the charged jet of the fluid is ejected from the tip of the Taylor cone. The discharged polymer solution jet undergoes an instability and elongation process, which allows the jet to become very long and thin. Meanwhile, the solvent evapo-rates, leaving behind a charged polymer fiber. In the case of the melt, the discharged jet solidifies when it travels in the air.

Bonding Methods

There are different bonding techniques available such as hotmelt gravure lamination technology, ultrasonic bonding technology, dipping bonding technology, UFD fiberized spray technology (hotmelt) and spun-web bonding technol-ogy.

Hotmelt gravure lamination technology is industrially established for an in line process. Thus, two steps bonding can also be done in one line for a "sandwich" type mem-brane. It uses a multi-purpose hotmelt laminating and coat-ing system which consists of a gravure roller for dot coating, a revolver dosing head (pos/pos or neg/neg) and application roller and a laminating roller and counter pressure roller.

The gravure roller is used to dot coating with adhesive, whereby two different reactive PU based adhesives (one for PU e-spinning membrane and the other for PA6 membrane) can be used. A high bond strength can be obtained by about 15-25% air permeability loss. The adhesive must be carefully chosen to avoid problems during end application of the membrane (conformity, physical & chemical suitability, medical & food grade etc.). A stiffening of the materials is observed because of adhesives.

The dipping bonding technology (chemical bonding) can be used for the pre-treatment of a carrier prior to the electrospinning process, which is sometimes preferable. Also, an additional process step for bonding can be eliminated, which is a major advantage. The two layer laminate can then be used for second bonding e.g., hotmelt, spunweb, UFD etc. to form a multilayer vent.

The UFD is a fiberized spray technology and the most advanced technology for hot melt adhesive applicators. The laminated plate technology (LPT) is applied to produce filament strands of adhesive. Heated air is used to elongate those strands and lay them down in random or ordered patterns. In many cases, by using UFD technology, one can cut adhesive usage by 20-50% without negatively influencing the bond strength or durability by a high precision application of adhesives. A non-contact mode is available which yields in less chance for damages of e-spun fibers during lamination. The UFD technology is a cleaner process than hotmelt gravure lamination.

The spun-web bonding technology yields rather a three-dimensional structure than a film with a closed surface. The open structure makes the resultant laminate more flexible and with high air permeability. Webs are made of different materials: co-polyamide, co-polyester, co-polyolefins, polyurethanes etc. The spun-web technology is a very simple process. Three major parameters to be considered during lamination are temperature, pressure and time.

Calendering

Calendering is used on materials such as fabric, mesh, laminate vent to obtain a smoother and thinner material, whereby the material is passed between or under rollers at raised temperatures and pressures. The size and shape of the pores can be affected depending on the calendering conditions.

Plasma PECVD

The plasma treatment of textile or other materials can be applied as a textile finishing process, i.e., for technical and medical textiles as well as for composite materials, to improve their surface properties like water and oil repellency. This is also possible for other materials and compact objects. Compared to conventional wet-chemical textile finishing, plasma technology shows advantages regarding environmental issues. With the PECVD treatment, e.g., improvement of adhesion characteristics, increasing hydrophilicity, introducing special functional groups on the surface, or modifying the surface morphology can be obtained.

In plasma deposition, which is commonly known as plasma polymerization or PECVD, a very thin polymer layer (nano-scaled) can be deposited on the substrate surface. The layer is formed through polymerization of an organic precursor gas which is directly polymerized on the substrate surface. In contrast to classic polymerization, plasma polymerization can use every monomer gas or vapor which is not limited to their reactivity. The plasma polymer shows unconventional polymerization behavior with branched and randomly terminated chains and a high degree of crosslinking.

The bulk structure of plasma polymers is completely irregular, far from that of conventional polymers. Plasma polymer coating (nanothin film) differs from conventional polymer by a high density of functional groups per volume, a highly cross-linked and branched plasma polymer network, a nanometer thick coating, a high adhesion of coating to the substrate and with no change of bulk properties of the substrate, which can be a polymeric fabric.

The plasma treatment can be performed in a plasma chamber, in case of a fabric having a plurality of rollers and/or expanders in a roll-to-roll system, which may operate with a radiofrequency, preferably of about 13 MHz to 14 MHZ, preferably of about 13.5 MHz or with a direct current (DC) power supply. Preferably all previously explained steps DF, DNF, PT and IG are carried out in this plasma chamber.

PERFORMANCE EXAMPLES

Below the performance and properties of fabrics being coated according to the inventions including DF coatings based on C3 fluorinated chemistries are shown.

Example 1

A contact angle of three liquids has been measured according to DIN 55660-2 on two different articles which on the one hand have been coated with a combined C3-based coating (DF), DNF coating and an IG step and on the other hand a C6-based FC coating (benchmark). As can be seen in FIG. 3, a similar hydro- and oleophobicity has been achieved even with the ultra-short chain eco-friendly C3-based coating (DF) compared to the C6-based coating. In addition, a little increase in contact angles for article 3A07-0019-115-XX were found compared to article 3A07-0025-158-XX. This can be explained as follows: higher fabric density (lower mesh opening) and finer filaments of 3A07-0019-115-XX contributes to better repellence effects.

Example 2

In order to make sure that the plasma coating (DN, DNF and IG steps) adheres well with the substrate, an internal washing test has been performed at 40° C. temperature for 47 min. Table 3 reveals a significant washing resistance of the coating. There is a little decrease in contact angles with three liquids which was measured according to DIN 55660-2, demonstrating high coating adhesion to the object. The oil repellency of the washed object has also been evaluated according to AATCC® 118 using 8 different liquid oils and the results show no changes in oil repellency after washing. Therefore, based on the invention it is possible to obtain a robust and reliable coating on polymeric fabric with excellent hydro- and oleophobic characteristics.

TABLE 3

| | Contact angle [°] according to DIN 55660-2 | | | Oil drop test according to AATCC ® 118 |
|---|---|---|---|---|
| Coating type | Water (top/ bottom side) | Diiodmethane (top/ bottom side) | Pentandiol (top/ bottom side) | [grade 1-8] (top/ bottom side) |
| DF/DNF coating before washing | 138.5/140.5 | 128.4/128.0 | 137.5/135.3 | 7 |
| DF/DNF coating after washing | 138.1/136.3 | 127.8/128.0 | 136.6/133.4 | 7 |

*Comparative example contact angles of three liquids on C3-coated polyester mesh article # 3A07-0025-158-XX*

Example 3

In order to evaluate water separation efficiency, the test has been performed according to ISO/TS 16332 standard on a DNF and DF coated polyester article. It can be seen in the table 4 that a comparable result with water separation efficiency greater than 90% was obtained even with C3-based environmentally friendly coating as compared to a C6-based coating (benchmark).

TABLE 4

*The developed coating shows excellent water separation efficiency*

| Coating type | Article | Water separation top side [%] | Water separation bottom side [%] |
|---|---|---|---|
| DNF + DF coating | 3A07-0019-115-XX | 90.7 | 90.6 |
| Benchmark: C6 based flourinated coating | 3A07-0019-115-XX | 90 | 90 |

Besides a performance test, also endotoxin and hemo-compatibility testing of fabrics coated according to the invention were performed.

Endotoxin testing is performed to determine the accessibility of the product for medical applications. The endotoxin limit is calculated according to Pharmacopoeia (EP 10, January 2020 and USP 42, May 1, 2019<85>). Both DF and DNF coated articles contain less than the endotoxin limit concentration and have passed the test.

Hemocompatibility of blood-contacting materials is also one of the most important criteria for medical applications. The interactions between newly developed coated materials and blood has been extensively analyzed, in accordance with ISO 10993-4 and ISO 10993-12, to prevent activation and destruction of blood components in applications. The hemo-compatibility analysis of the coated articles are summarized in the below table 5 and all coated articles passed the test.

TABLE 5

*The limulus amoebocyte lysate (LAL, according to Pharmacopoeia EP 10 and USP 42 <85>) and hemolysis (ISO 10993-4 and ISO 10993-12) shows the coating compliance for medical applications*

| Coaing type | Article | Test type | Tested parameter | Results | Specification (limit value) | Pass/ Fail |
|---|---|---|---|---|---|---|
| DF-based fluorinated coating | 3A07-0019-055-XX | LAL | Endotox in [EU/ml] | 0.063 | ≤0.125 | PASS |
| | | | PPC (positive product control) [%] | 108 | 50-200 | PASS |
| DF-based fluorinated coating | 3A07-0019-055-XX | Hemolysis | OD (optical density) | 0.008 | ≤0.03 | PASS |
| DNF-based coating | 3A07-0025-158-XX | LAL | Endotox in [EU/ml] | 0.063 | ≤0.125 | PASS |
| | | | PPC (positive product control) [%] | 99 | 50-200 | PASS |
| DNF-based coating | 3A07-0025-158-XX | Hemolysis | OD (optical density) | 0.002 | ≤0.03 | PASS |

In order to fulfil biocompatibility requirements in medical applications, the cytotoxicity test has been performed on a DNF and DF coated polyester article according ISO 10993-5 to determine how much the coated articles can damage, or even cause the death of human cells. The optical evaluation of the cell morphology and cell viability have been presented in the table 6. It was found that the coating almost don't inhibit the cell growth. The cell viability for the coating is also very good, and thus the coating meets the requirements of ISO 10993-5.

TABLE 6

| Cytotoxicity results on coated articles | | | | |
|---|---|---|---|---|
| Coating type | Article | Cell morphology | Reactivity | Viability [%] |
| DNF + DF | 3A07-0019-055-XX | 10-20% growth inhibition | 1/1/0 | 76 |

Based on the invention it is possible to provide a method of producing an object having a fluorinated polymer coating deposited by a plasm deposition process, which is free of per- and polyfluorinated acids and salts thereof as well as an object comprising a fluorinated polymer coating which is free of per- and polyfluorinated acids and salts thereof.

What is claimed is:

1. A method of producing an object having a fluorinated polymer coating free of per-and polyfluorinated acids and salts thereof, wherein the method comprises:

performing a step DF of depositing a fluorinated polymer coating on the object by means of plasma polymerization of a fluorinated precursor monomer;

performing a step IG of exposing the fluorinated polymer coating on the object to an inhibiting gas which inhibits the formation of per- and polyfluorinated acids and salts thereof in or on the deposited fluorinated polymer coating and, when the fluorinated polymer coating is exposed to the inhibiting gas, no plasma is present, wherein the step IG is carried out after the step DF, and wherein from the start of the step DF until the end of the step IG the object is treated in a substantially oxygen free atmosphere.

2. The method according to claim 1, further comprising:

performing a step DNF of depositing a non-fluorinated polymer coating on the object by means of plasma polymerization of a non-fluorinated precursor monomer, wherein the step DNF is carried out before and/or after the step DF.

3. The method according to claim 2, wherein the plasma deposition processes for depositing the fluorinated polymer coating in the step DF and/or plasma deposition processes for depositing the non-fluorinated polymer coating in the step DNF are radical-dominated plasma processes and are low-pressure plasma processes and/or atmospheric plasma processes under protective atmosphere.

4. The method according to claim 2, wherein the non-fluorinated precursor monomer in the step DNF comprises a non-fluorinated organosilane, organosiloxane, hydrocarbon, or a combination thereof.

5. The method according to claim 2, further comprising:

performing a step PT of pretreating the object by means of an atmospheric or low-pressure plasma using an inert gas and/or a reactive gas, wherein the step PT is carried out before the step DNF and/or the step DF.

6. The method according to claim 5, wherein the step IG is carried out every time, directly, after the step DF, the step PT and/or the step DNF is carried out, to inactivate reactive plasma based species formed on the object during the steps DF, PT and/or DNF.

7. The method according to claim 5, wherein the step PT is carried out first, the step DNF is carried out second, the step DF is carried out third, the step IG is carried out fourth, and then optionally the step DNF is carried out again, and wherein from the start of the step PT until the end of the step IG the object is treated in a substantially oxygen free atmosphere.

8. The method according to claim 7, wherein a thickness of the non-fluorinated polymer coating is greater than that of the fluorinated polymer coating.

9. The method according to claim 2, wherein the fluorinated polymer coating deposited on the object in the step DF has a thickness from 5 nm to 300 nm; and/or the non-fluorinated polymer coating deposited on the object in the step DNF has a thickness from 30 nm to 700 nm.

10. The method according to claim 2, wherein a plasma power during the step DF and the step DNF is lower than 1 $W/cm^2$ of an electrode surface.

11. The method according to claim 10, wherein the fluorinated polymer coating is hydrophobic and oleophobic and is free from per-and polyfluorinated acids and salts thereof according to Standard 100 by OEKO-TEX and/or DIN CEN/TS 15968:2010.

12. The method according to claim 1, wherein the inhibiting gas in the step IG comprises hydrogen, nitrogen, hydrocarbon, or a mixture thereof.

13. The method according to claim 1, wherein the object comprises polymeric materials of woven mesh, woven fabrics, knitted fabrics, nonwoven, nonwoven meltblown, nonwoven spunbond fabric, membranes, composite membranes and combinations thereof.

14. An object comprising a fluorinated polymer coating formed thereon by the method according to claim 1, wherein the fluorinated polymer coating is free from per-and polyfluorinated acids and salts thereof according to Standard 100 by OEKO-TEX and/or DIN CEN/TS 15968:2010.

15. The method according to claim 1, wherein the inhibiting gas comprises hydrocarbon.

16. The method according to claim 1, wherein the fluorinated polymer coating is hydrophobic and oleophobic.

17. The method according to claim 16, wherein the fluorinated precursor monomer comprises hexafluoropropene, octafluoropropene, trifluoropropene, pentafluoropropene, an acrylic monomer with three carbon atoms, or a combination thereof.

18. The method according to claim 17, further comprising:

prior to performing the step DF, performing a first step DNF of depositing a first non-fluorinated polymer coating on the object over the fluorinated polymer coating by means of plasma polymerization of a first non-fluorinated precursor monomer; and after performing the step DF and the step IG, performing a second step DNF of depositing a second non-fluorinated polymer coating on the object over the fluorinated polymer coating and the first non-fluorinated polymer coating by means of plasma polymerization of a second non-fluorinated precursor monomer, wherein, from the start of the first step DNF until the end of the second step DNF, the object is contained in a chamber with a substantially oxygen free atmosphere, wherein the plasma polymerization processes performed in the step DF, the first step DNF, and the second step DNF are low-pressure plasma processes and/or atmospheric plasma processes using a plasma power of lower than 1 W/cm² of an electrode surface, wherein the fluorinated polymer coating is free from per-and polyfluorinated acids and salts thereof according to Standard 100 by OEKO-TEX and/or DIN CEN/TS 15968:2010, wherein a thickness of the first non-fluorinated polymer coating and of the second non-fluorinated polymer coating is greater than that of the fluorinated polymer coating.

19. The method according to claim 18, wherein the first non-fluorinated precursor monomer and the second non-fluorinated precursor monomer each comprise a non-fluorinated organosilane, organosiloxane, hydrocarbon, or a combination thereof.

20. The method according to claim 1, wherein the fluorinated precursor monomer comprises a perfluorocarbon, perfluorohydrocarbon, or polyfluorohydrocarbon having three carbon atoms.

* * * * *